US007286716B2

(12) United States Patent
Kim (10) Patent No.: US 7,286,716 B2
(45) Date of Patent: Oct. 23, 2007

(54) IMAGE QUALITY ENHANCEMENT CIRCUIT AND METHOD USING INTER-FRAME CORRELATIVITY

(75) Inventor: Jae-won Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 869 days.

(21) Appl. No.: 10/600,647

(22) Filed: Jun. 23, 2003

(65) Prior Publication Data

US 2004/0008903 A1    Jan. 15, 2004

(30) Foreign Application Priority Data

Jul. 15, 2002    (KR) ............... 2002-41365

(51) Int. Cl.
    *G06K 9/40*    (2006.01)
(52) U.S. Cl. ............ 382/254; 382/169; 382/274; 382/275; 358/3.26; 358/3.27; 358/522
(58) Field of Classification Search ............ 382/263, 382/274, 275, 278, 169, 284; 358/3.26, 3.27, 358/463, 520, 522
See application file for complete search history.

(56) References Cited

U.S. PATENT DOCUMENTS

| 5,353,355 | A  | * | 10/1994 | Takagi et al. ............ 382/111 |
| 5,956,435 | A  | * | 9/1999  | Buzug et al. ............ 382/283 |
| 5,982,926 | A  | * | 11/1999 | Kuo et al. .............. 382/167 |
| 6,175,427 | B1 | * | 1/2001  | Lehmbeck et al. ........ 358/1.9 |
| 6,343,143 | B1 | * | 1/2002  | Guillemaud et al. ...... 382/130 |
| 6,430,430 | B1 | * | 8/2002  | Gosche ................. 600/410 |
| 6,535,650 | B1 | * | 3/2003  | Poulo et al. ............ 382/284 |
| 6,549,646 | B1 | * | 4/2003  | Yeh et al. .............. 382/132 |
| 6,650,774 | B1 | * | 11/2003 | Szeliski ................ 382/169 |
| 6,694,051 | B1 | * | 2/2004  | Yamazoe et al. ......... 382/167 |
| 6,701,026 | B1 | * | 3/2004  | Zheng et al. ............ 382/274 |

FOREIGN PATENT DOCUMENTS

| KR | 183830 | 12/1996 |
| KR | 207660 | 4/1999  |
| KR | 188679 | 11/1999 |
| KR | 255636 | 2/2000  |
| KR | 319864 | 7/2000  |

\* cited by examiner

*Primary Examiner*—Yosef Kassa
(74) *Attorney, Agent, or Firm*—Staas & Halsey LLP (57) ABSTRACT

An image quality enhancement circuit and a method using inter-frame correlativity includes a first transfer function generator calculating histogram data corresponding to a gray level distribution with respect to an inputted luminance signal by frame unit to generate a first transfer function by using the histogram data, an inter-frame correlativity calculator calculating inter-frame correlation coefficients from the histogram data for at least one previous frame and a current frame to output inter-frame correlation information corresponding to the correlation coefficients, a transfer function adjustor selectively outputting the first transfer function based on the inter-frame correlation information outputted from the inter-frame correlativity calculator, and a mapper correcting and outputting the inputted luminance signal based on the transfer function outputted from the transfer function adjustor. The image quality enhancement circuit and method using inter-frame correlativity selectively apply a histogram equalization process based on the correlativity between consecutive frames, thereby enhancing an image quality.

35 Claims, 6 Drawing Sheets

IMAGE QUALITY ENHANCEMENT CIRCUIT AND METHOD USING INTER-FRAME CORRELATIVITY

CROSS-REFERENCE TO RELATED APPLICATIONS

This application claims the benefit of Korean Application No. 2002-41365, filed Jul. 15, 2002, in the Korean Intellectual Property Office, the disclosure of which is incorporated herein by reference.

BACKGROUND OF THE INVENTION

1. Field of the Invention

The present invention relates to an image quality enhancement circuit and method of enhancing an image quality using correlativity between frames, and more particularly, to an image quality enhancement circuit and method of enhancing an image quality by adaptively compensating for a luminance signal based on correlativity between frames.

2. Description of the Related Art

A histogram equalization of various methods for contrast enhancements is widely known. In general, the histogram equalization has an effect on stretching a dynamic range of an image so as to distribute gradations of resultant images flat, thereby enhancing a contrast of images.

Such widely known characteristics of the histogram equalization turn out as defects in some practical occasions. That is, a constant output density of the histogram equalization brings an average brightness of output images closer to a middle gray level.

In the known histogram equalization, a transfer function is independently calculated for and applied to every frame regardless of correlativity between adjacent frames. Such an application of the conventional histogram equalization provides a contrast-enhanced effect to the images when the correlativity between the adjacent frames becomes low, but the application of the conventional histogram equalization may cause a problem of degrading an image quality when a correlation value becomes high. For example, a flicker phenomenon, by which a display changes its brightness from bright to dark, occurs in a case that a current frame shows a particular object that does not exist on a previous frame while the previous and current frames have the same background image.

SUMMARY OF THE INVENTION

The present invention has been devised to solve the above and/or other problems, and it is an aspect of the present invention to provide an image quality enhancement circuit and a method of adaptively applying a histogram equalization to an image based on correlativity between frames.

Additional aspects and advantages of the invention will be set forth in part in the description which follows and, in part, will be obvious from the description, or may be learned by practice of the invention.

According to the above and/or other aspects of the present invention, an image quality enhancement circuit using inter-frame correlations to perform histogram equalization on a luminance signal represented in a predetermined number of gray levels includes a first transfer function generator calculating histogram data corresponding to a gray level distribution with respect to an inputted luminance signal by a frame unit to generate a first transfer function by using the histogram data, an inter-frame correlativity calculator calculating inter-frame correlation coefficients from the histogram data for at least one previous frame and a current frame to output inter-frame correlation information corresponding to the inter-frame correlation coefficients, a transfer function adjustor selectively outputting the first transfer function based on the inter-frame correlation information outputted from the inter-frame correlativity calculator, and a mapper correcting and outputting the inputted luminance signal based on the transfer function outputted from the transfer function adjustor.

According to another aspect of the invention, the inter-frame correlativity calculator includes a first correlation coefficient calculator calculating a first correlation coefficient based on first histogram data of a previous frame and second histogram data of a current frame, and an image change decision unit comparing the first correlation coefficient with a set threshold value to output an image change detection signal to the transfer function adjustor if the first correlation coefficient is below the set threshold value. The transfer function adjustor outputs the first transfer function to the mapper if the image change detection signal is received.

According to another aspect of the present invention, the transfer function adjustor outputs to the mapper an accumulated average value of first transfer functions obtained from a frame having an image change (image change detection signal) detected in the image change decision unit to another frame just before the current frame while the image change detection signal does not occur from the image change decision unit.

According to another aspect of the present invention, the inter-frame correlativity calculator further includes a second correlation coefficient calculator calculating a second correlation coefficient from the histogram data for a frame set to be compared with previous frames and the histogram data of the current frame, and a panning decision unit determining a panning phenomenon if the second correlation coefficient gradually decreases in a predetermined number of frames which is set while the image change detection signal does not occur from the image change decision unit, to output a panning detection signal to the transfer function adjustor.

If the panning detection signal is received from the panning decision unit, the transfer function adjustor outputs to the mapper the accumulated average value of first transfer functions obtained from the frame having the image change detection signal to the another frame just before the current frame, as a second transfer function.

The frame of the second correlation coefficient calculator to be compared with the previous frames is updated to be set as a panning phenomenon stop frame next to a frame having the image change detected in the image change decision unit or a final frame having the panning phenomenon from the panning decision unit.

The transfer function adjustor outputs to the mapper a signal corresponding to 1 as a transfer function value if the panning detection signal and the image change detection signal are not received.

The first transfer function generator includes a frame histogram calculator calculating the histogram data, a frame average calculator calculating an average level of the inputted luminance signal by frame unit, a divider dividing the histogram data into a predetermined number of sub-frames based on the average level of the luminance signal to calculate a probability density function by sub-frame k, and a CDF (cumulative density function) calculator calculating an accumulated density function by the sub-frame based on the probability density function outputted by the sub-frame to output the accumulated density function as the first transfer function.

Further, in order to achieve the above and/or other aspects of the invention, an image quality enhancement method of enhancing image quality by] of performing histogram equalization on a luminance signal represented in a predetermined number of gray levels using inter-frame correlations to enhance an image quality includes calculating histogram data corresponding to a gray level distribution with respect to the inputted luminance signal by a frame unit, generating a first transfer function by using the histogram data, calculating inter-frame correlation coefficients from the histogram data for at least one previous frame and a current frame to output inter-frame correlation information corresponding to correlations, and selectively applying the first transfer function to correct the inputted luminance signal based on the inter-frame correlation information.

According to another aspect of the invention, an image change is determined if a first correlation coefficient obtained for correlation between the previous frame and the current frame is below a set threshold value, and the first transfer function is applied to the inputted luminance signal for correction of the inputted luminance signal.

Further, a second correlation coefficient is calculated from histogram data for a frame set to be compared with previous frames and histogram data of the current frame, a panning phenomenon is determined if the second correlation coefficient gradually decreases in a predetermined number of frames which is set while the first correlation coefficient is not below the set threshold value, and an average value of the first transfer functions obtained from a frame having the first correlation coefficient, which is below the threshold value, with the previous frame just before the current frame is, as a transfer function, applied to the inputted luminance signal for correction.

According to another aspect of the invention, the correction is not performed with respect to the inputted luminance signal if the inter-frame correlation information does not indicate the image changes or the panning phenomenon.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, image quality enhancement circuits and methods using correlativity between frames according to the present invention are described in detail with reference to the attached drawings.

Figure 1:
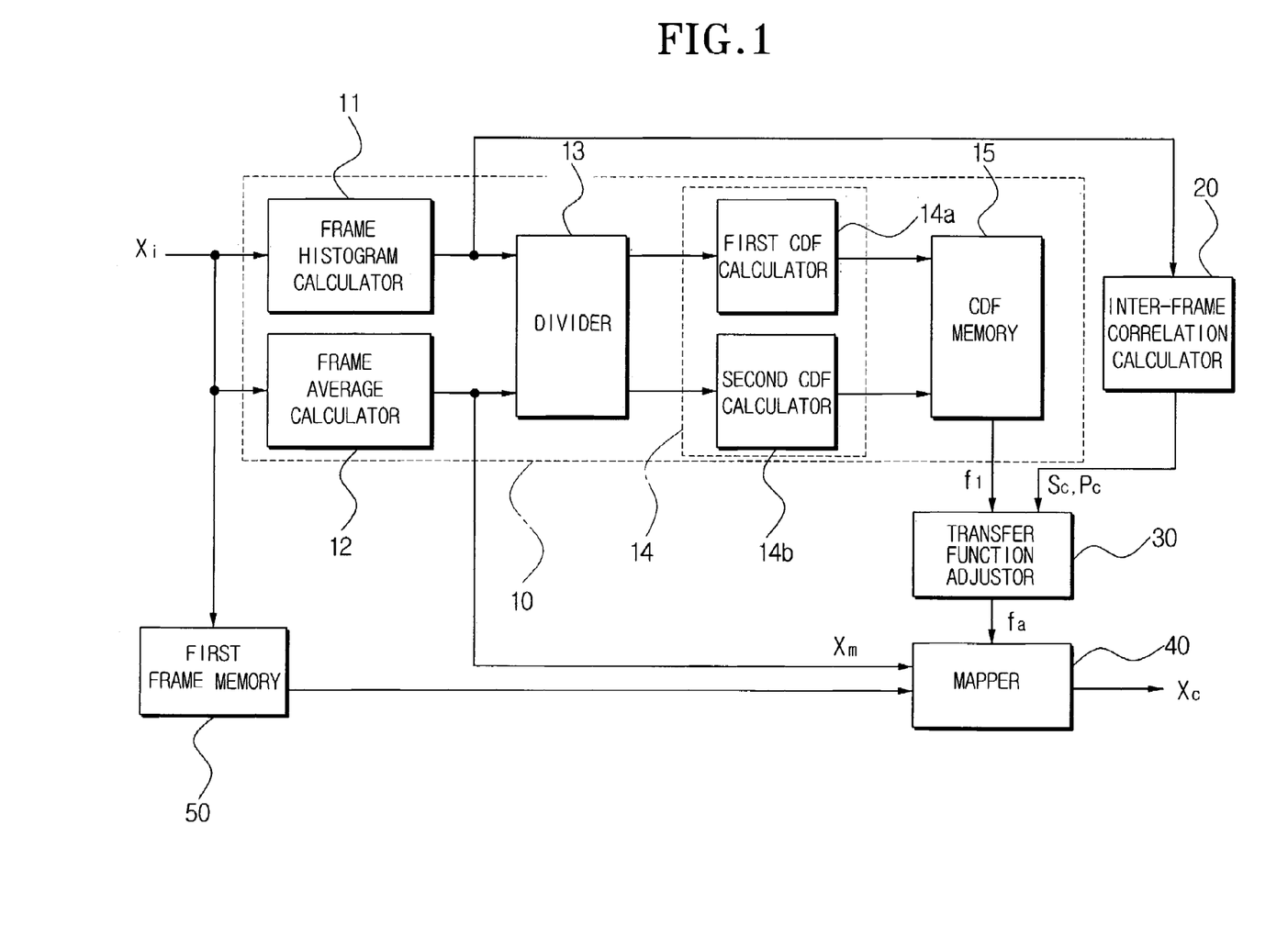
FIG. 1 is a block diagram showing an image quality enhancement circuit according to an embodiment of the present invention.

FIG. 1 is a block diagram showing an image quality enhancement circuit according to an embodiment of the present invention. Referring to FIG. 1, the image quality enhancement circuit includes a first transfer function generator 10, an inter-frame correlativity calculator 20, a transfer function adjustor 30, a mapper 40, and a first frame memory 50 delaying an inputted luminance signal.

The first transfer function generator 10 calculates histogram data corresponding to a luminance level distribution by a pixel in a frame unit inputted to the first transfer generator 10 and generates a first transfer function f1 by using the histogram data.

A transfer function generator adapted for use in various known histogram equalizers may be employed for the first transfer function generator 10.

For example, the transfer function generator 10 may be one of transfer function generators applied for the histogram equalizers disclosed in Korean Patent Nos. 255636, 319864, 207660, 183830, and 188679.

The transfer function generator disclosed in Korean Patent No. 183830 out of the above histogram equalizers is applied for the first transfer function generator 10 for an embodiment as an example of the present invention.

The first transfer function generator 10 includes a frame histogram calculator 11, a frame average calculator 12, a divider 13, a CDF calculator 14 having a first CDF calculator 14a and a second CDF calculator 14b, and a CDF memory 15.

The frame histogram calculator 11 calculates a histogram by a frame unit for the inputted luminance signal, that is, calculates a gray level distribution of one frame image. Here, the frame unit is referred to a field or frame unit, and descriptions are made in a case of the frame unit hereinafter as an example.

The frame average calculator 12 calculates an average level by the frame unit with respect to the inputted luminance signal.

The divider 13 divides the gray level distribution calculated in the frame histogram calculator 11 into a predetermined number of, for example, two sub-frames based on the average level calculated in the frame average calculator 12, and outputs probability density functions of the two sub-frames.

The first CDF calculator 14a uses a probability density function for one of the sub-frames (hereinafter, referred to as 'first sub-frame') which is below the average level in the frame samples outputted from the divider 13, and calculates a first accumulated density function.

The second CDF calculator 14b uses a probability density function for the other one of the sub-frames (hereinafter, referred to as 'second sub-frame') above an average level in the frame samples outputted from the divider 13, and calculates a second accumulated density function.

The CDF memory 15 is updated with the first and second accumulated density functions calculated in the CDF calculator 14 by the frame unit according to a synchronous signal, and outputs a previously stored accumulated density function to the transfer function adjustor 30 during updating the CDF memory 15. Here, the synchronous signal becomes a field synchronous signal if the frame unit is a field, or a frame synchronous signal if the frame unit is a frame, and the CDF memory 15 is used as a buffer.

The above transfer function generating process of the first transfer function generator 10 is disclosed in Korean Patent No. 183830, and thus a detailed description of the transfer function generating process will be omitted here.

The inter-frame correlation calculator 20 uses the histogram data outputted from the frame histogram calculator 11 to calculate an inter-frame correlativity.

The inter-frame correlativity calculator 20 is described with reference to FIG. 2.

Figure 2:
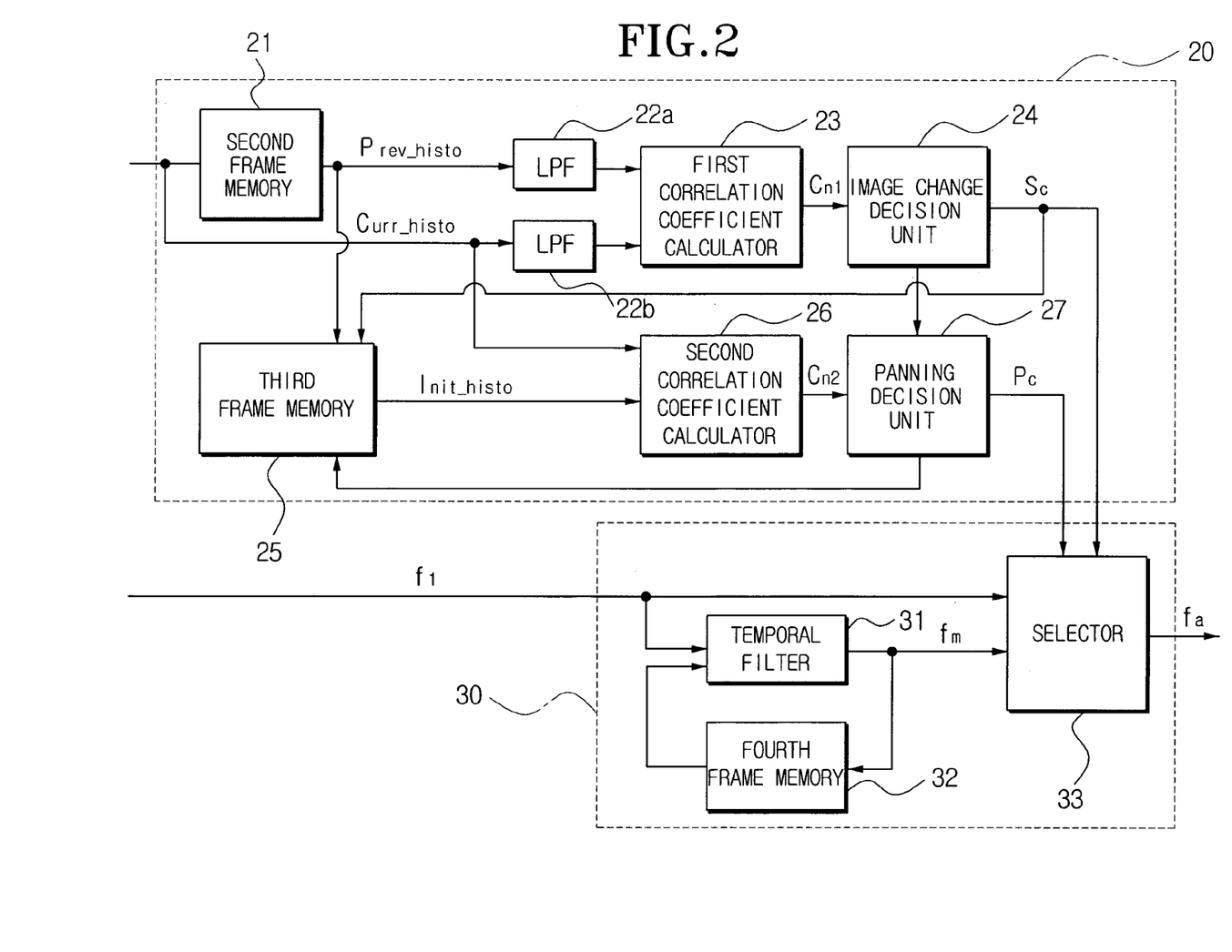
FIG. 2 is a block diagram showing an inter-frame correlativity calculator of the image quality enhancement circuit shown in FIG. 1.

Referring to FIG. 2, the inter-frame correlativity calculator 20 includes a first correlation coefficient calculator 23, an image change decision unit 24, a second correlation coefficient calculator 26, and a panning decision unit 27. The inter-frame correlativity calculator 20 further includes a second frame memory 21 delaying the histogram data for the current frame outputted from the frame histogram calculator 11 by one frame with respect to the current frame, and low-pass filters (LPF) 22a and 22b.

The first correlation coefficient calculator 23 uses a correlation coefficient calculation formula expressed by the following formula 1 with respect to current frame histogram data (Curr_histo) and previous frame histogram data (Prev_histo) to calculate a first correlation coefficient $C_{n1}$.

$$C_{n1} = Q_{@i} \frac{(x_i - x_m)(y_i - y_m)}{\sqrt{Q_{@i}(x_i - x_m)^2 Q_{@i}(y_i - y_m)^2}}$$

Here, the subscript i indicates a pixel number, $x_i$ a luminance level value of a corresponding pixel number for the current frame, $y_i$ a luminance level value of a corresponding pixel number for the previous frame, $x_m$ a histogram average value of the current frame, and $y_m$ a histogram average value of the previous frame.

The image change decision unit 24 compares a set threshold value with the first correlation coefficient Cn1 calculated and outputted by the first correlation coefficient calculator 23 based on the formula 1 and outputs a signal corresponding to a comparison result of the image change decision unit 24. For example, the image change decision unit 24 outputs a high signal (Sc=1) as a detection signal of frame image changes if the first correlation coefficient Cn1 is below the set threshold value, and outputs a low signal (Sc=0) as a non-detection signal of the frame image changes if the first correlation coefficient Cn1 is above the set threshold value.

Figure 3:
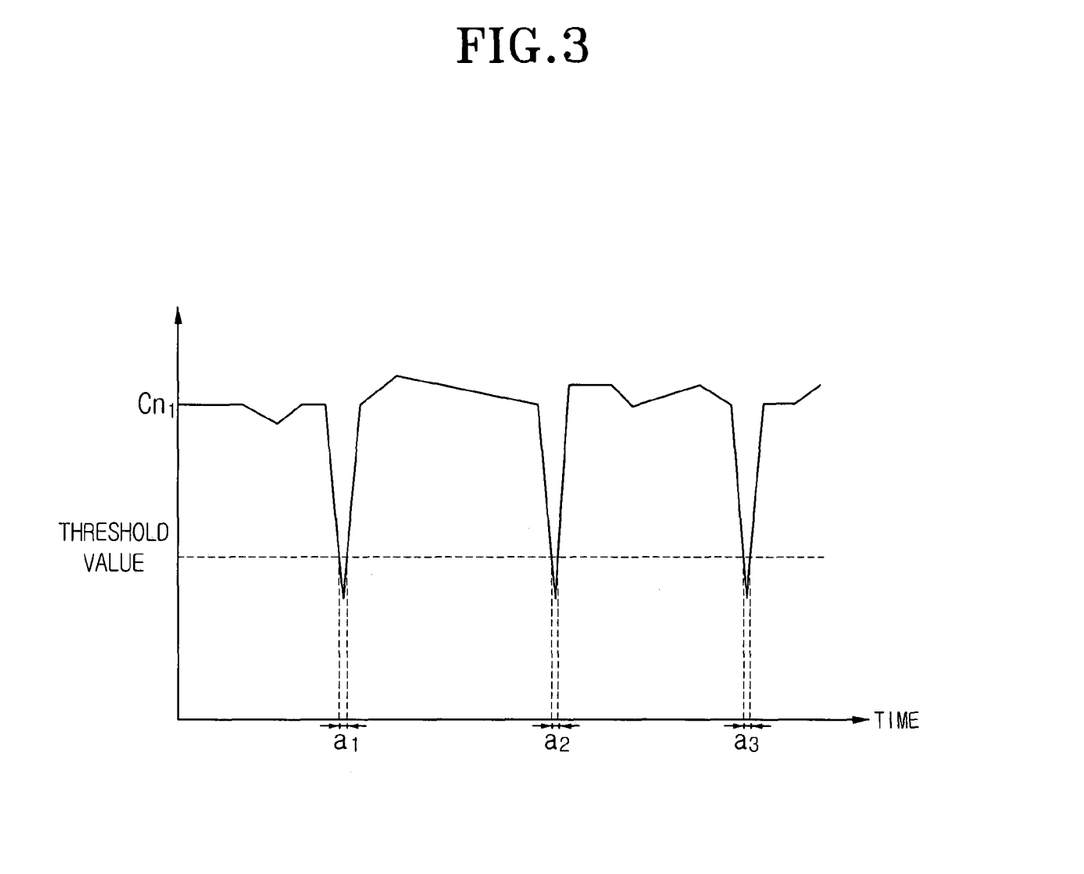
FIG. 3 is a graph explaining a process of detecting image changes from correlation coefficients between previous and current frames calculated by the inter-frame correlativity calculator shown in FIG. 2.

That is, when first correlation coefficients $C_{n1}$ are outputted in a pattern shown in FIG. 3, the image change decision unit 24 outputs a frame change detection signal indicating an abrupt image change in each of sections a1, a2, and a3.

The threshold value is properly decided based on the characteristics of applied frames. It is possible that the threshold value is determined in a range from 0.9 to 0.95.

The second correlation coefficient calculator 26 uses a correlation coefficient calculation formula expressed by the following formula 2 with respect to the histogram data (Init_histo) outputted from a third frame memory 25 which stores the histogram data of a frame to be compared with the histogram data (Curr_histo) of the current frame, to calculate a second correlation coefficient $C_{n2}$. Like elements as in formula 1 are indicated as like symbols.

$$C_{n2} = Q_{@i} \frac{(x_i - x_m)(z_i - z_m)}{\sqrt{Q_{@i}(x_i - x_m)^2 Q_{@i}(z_i - z_m)^2}}$$

Here, $z_i$ denotes a luminance level value of a corresponding pixel number for a frame set for comparison, and $z_m$ a histogram average value of a frame to be compared.

Either a frame having an image change detected, or a frame next to the frame determined by the panning decision unit 27 (described later) to have a panning phenomenon, is decided as a frame for comparison, i.e., as histogram data which is updated and stored in the third frame memory 25. The frame for comparison is updated into the third frame memory 25 every time that the above-defined frames occur.

The panning decision unit 27 determines whether there exists the panning phenomenon by using the output signal Sc of the image change decision unit 24 and the second correlation coefficient $C_{n2}$ of the second correlation coefficient calculator 26. The panning phenomenon is referred to a phenomenon in which the inter-frame correlativity, which is higher than the correlativity determined by the image change decision unit 24 in case of an image change, gradually decreases.

The panning decision unit 27 determines the panning phenomenon if the image change decision unit 24 maintains the frame image change non-detection signal (Sc=0) for a set of panning detection sections, for example, 10 to 20 frames and the second correlation coefficient $C_{n2}$ gradually decreases, and outputs a panning detection signal (Pc=1) to the transfer function adjustor 30.

Figure 4:
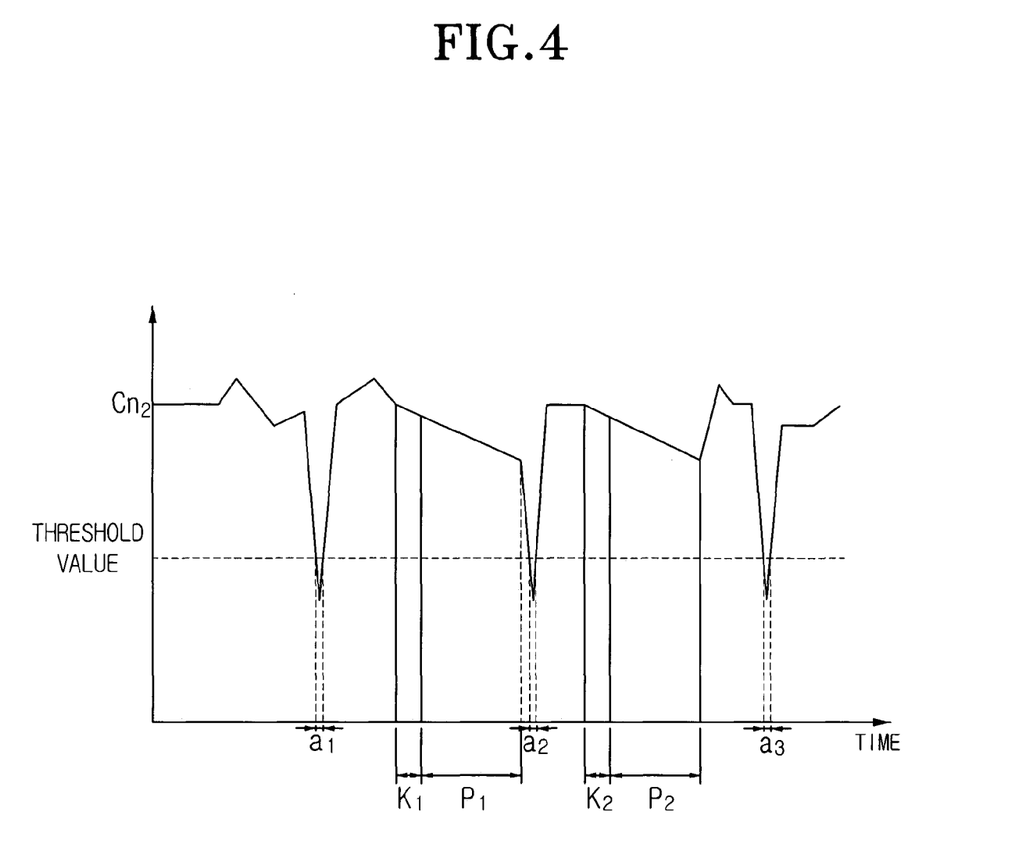
FIG. 4 is a graph explaining another process of detecting a panning phenomenon from correlation information between an image-changing frame and a current frame, which is detected by the inter-frame correlativity calculator shown in FIG. 2.

That is, as shown in FIG. 4, when the second correlation coefficient $C_{n2}$ is outputted, sections k1 and k2 correspond to the panning detection sections, and sections P1 and P2 correspond to panning sections.

Referring to FIG. 4, either the frames next to the panning sections P1 and P2, i.e., next to timing points that the panning sections stop, or the image change frames a1, a2, and a3 having the first correlation coefficients $C_{n1}$ lower than the threshold value, are updated and stored in the third frame memory 25 by order of generation as the histogram data for frame comparison during the second correlation coefficient calculation.

The transfer function adjustor 30 selectively adopts the first transfer function f1 based on correlation information outputted from the inter-frame correlativity calculator 20.

In FIG. 2 illustrating the transfer function adjustor 30, the transfer function adjustor 30 includes a temporal filter 31, a fourth frame memory 32, and a selector 33.

The temporal filter 31 is a low pass filter calculating an accumulated average value fm of the first transfer function of the current frame and first transfer functions of frames from an image change occurrence to a frame just before the current frame. The fourth frame memory 32 stores the accumulated average value fm calculated by the temporal filter 31 and inputs the accumulated average value fm to the temporal filter 32.

The selector 33 selectively outputs the first transfer function f1, the accumulated average value fm of the first transfer function inputted through the temporal filter 31, and a transfer function corresponding to 1 as a transfer function fa.

That is, the selector 33 outputs the first transfer function f1 to the mapper 40 as the transfer function fa if the image change detection signal (Sc=1) is inputted from the image change decision unit 24, outputs the accumulated average value of the first transfer functions inputted through the temporal filter 31 as the transfer function fa if the panning detection signal (Pc=1) is inputted from the panning decision unit 27, and outputs to the mapper a signal that a transfer function value corresponds to 1 as the transfer function fa if the image change non-detection signal (Sc=0) and the panning non-detection signal(Pc=0) is inputted. Here, the transfer function value, 1, corresponds to an output of the mapper 40 without a correction with respect to an input image signal stored in the first frame memory 50.

The mapper 40 uses the transfer function value outputted from the transfer function adjustor 30 to map the input luminance signal stored in the first frame memory 50, and outputs a corrected luminance signal Xc.

Figure 5:
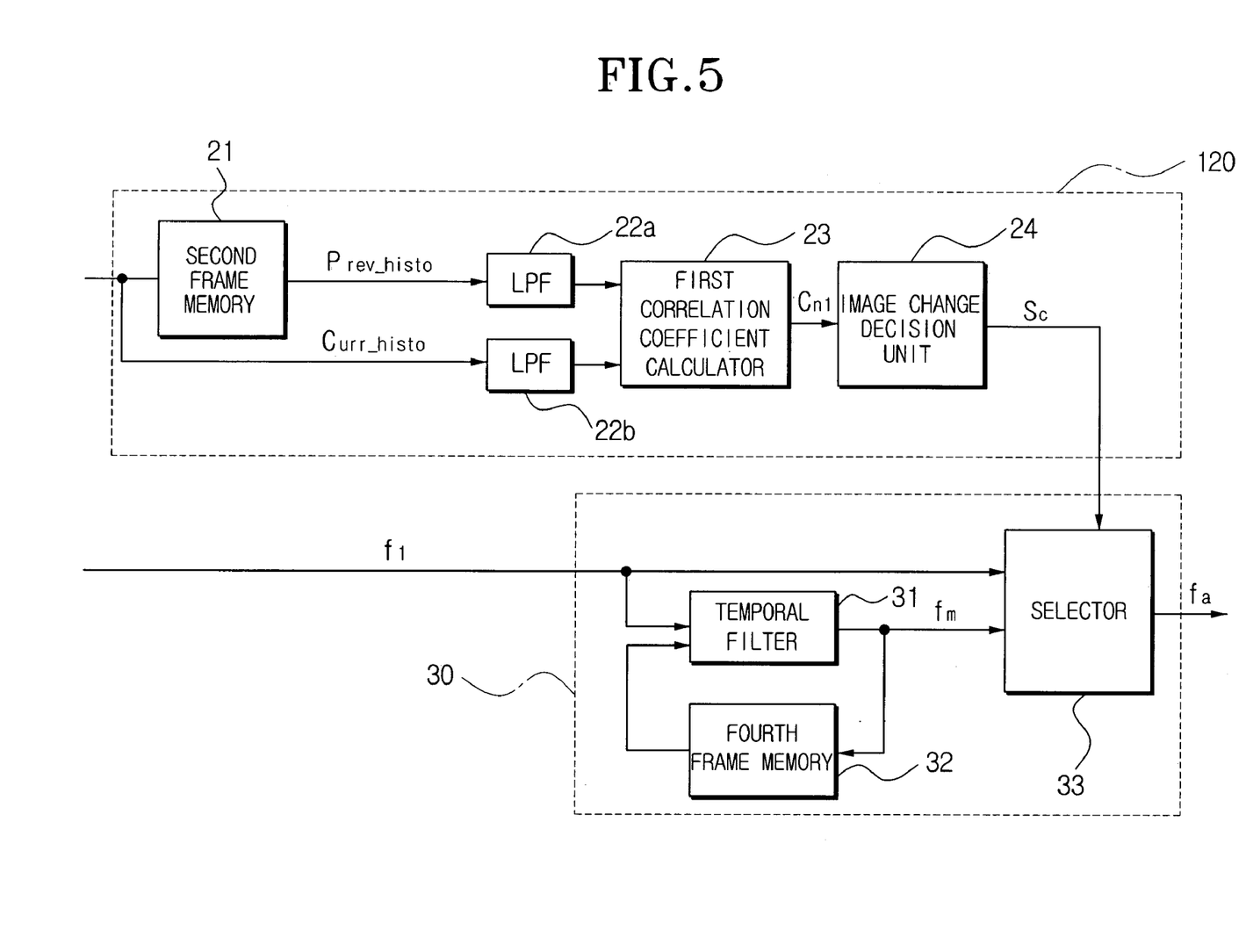
FIG. 5 is a block diagram partially showing an image quality enhancement circuit according to another embodiment of the present invention.

In the meantime, FIG. 5 illustrates an inter-frame correlativity calculator 120 different from one shown in FIG. 2. Constituents having like functions are indicated by the like reference numerals previously shown in FIG. 2.

In FIG. 5, the inter-frame correlativity calculator 120 includes a first correlation coefficient calculator 23 and an image change decision unit 24.

The selector 33 outputs the first transfer function f1 if the image change detection signal (Sc=1) is received from the image change decision unit 24, and outputs a signal outputted from the transfer function adjustor 30 if the image change non-detection signal (Sc=0) is received.

In the meantime, when no image change occurs, unlike the illustration shown in FIG. 5, predetermined weights may be respectively applied to the first transfer function f1 of the current frame and the accumulated average transfer function fm outputted through the temporal filter 31. The first transfer function f1 and the accumulated average transfer function fm are added as another transfer function fw. That is, when the image change non-occurrence signal (Sc=0) is outputted, a set weight W1 is applied to the first transfer function f1 of the current frame and a set weight W2 is applied to the accumulated average transfer function, all of which are added to obtain a value that can be applied as the final transfer function fn.

The another transfer function fw of the above method may be obtained through the following formula 3.

$$fw = w1*f1 + w2*fm \qquad \text{Formula 3}$$

Here, w1 and w2 are weight values (set weights), which are decided to be 1 when added.

Further, the weights to be respectively applied to the first transfer function f1 and the accumulated average transfer function fm are appropriately determined by characteristics of the input image signal or experimental design values.

Figure 6:
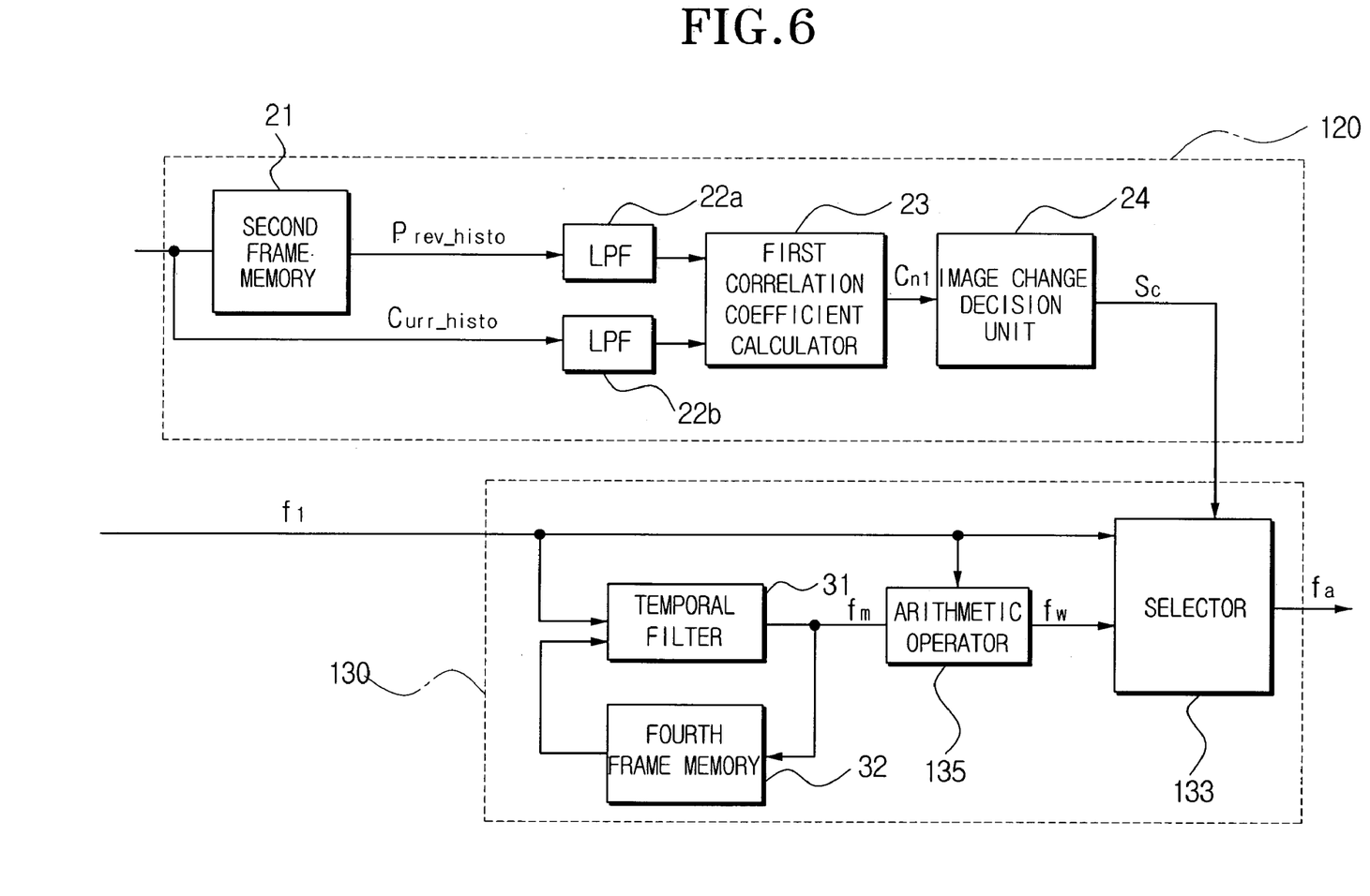
FIG. 6 is a block diagram partially showing an image quality enhancement circuit according to another embodiment of the present invention.

FIG. 6 shows a block diagram partially showing an image quality enhancement circuit according to another embodiment of the present invention.

Referring to FIG. 6, the transfer function adjustor 130 further includes an arithmetic operator 135 performing arithmetic operations with respect to the first transfer function f1 and the accumulated average transfer function fm outputted from the temporal filter 31, and outputs an operation result to the selector 133.

The arithmetic operator 135 performs the arithmetic operations based on the formula 3 previously described with the weights respectively set for the first transfer function and the accumulated transfer function, and outputs the operation result as the final transfer function fw.

In the above case, the selector 133 outputs the first transfer function f1 if the image change detection signal (Sc=1) is received from the image change decision unit 24, and outputs a resultant value operated based on the formula 3 in the arithmetic operator 135 if the image change non-detection signal (Sc=0) is received.

As described so far, the image quality enhancement circuit and method using inter-frame correlativity according to the present invention selectively apply a histogram equalization process based on a correlativity between consecutive frames, thereby enhancing an image quality.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image quality enhancement circuit using inter-frame correlations in a circuit performing histogram equalization on a luminance signal represented in the predetermined number of gray levels, comprising:

a first transfer function generator calculating histogram data corresponding to a gray level distribution with respect to an inputted luminance signal by a frame unit to generate a first transfer function by using the histogram data;

an inter-frame correlativity calculator calculating inter-frame correlation coefficients from the histogram data for at least one previous frame and a current frame, to output inter-frame correlation information corresponding to the inter-frame correlation coefficients;

a transfer function adjustor selectively outputting the first transfer function based on the inter-frame correlation information outputted from the inter-frame correlativity calculator; and a mapper correcting and outputting the inputted luminance signal based on the first transfer function outputted from the transfer function adjustor.

2. The image quality enhancement circuit as claimed in claim 1, wherein the histogram data comprises first histogram data and second histogram data, and the inter-frame correlativity calculator comprises:

a first correlation coefficient calculator calculating a first correlation coefficient based on the first histogram data of the at least one previous frame and the second histogram data of the current frame; and an image change decision unit comparing the first correlation coefficient with a set threshold value to detect an image change, and outputting an image change detection signal to the transfer function adjustor if the first correlation coefficient is below the threshold value, the transfer function adjustor outputting the first transfer function to the mapper upon receiving the image change detection signal.

3. The image quality enhancement circuit as claimed in claim 2, wherein the first correlation coefficient calculator calculates the first correlation coefficient by:

$$C_{n1} = Q_{@i} \frac{(x_i - x_m)(y_i - y_m)}{\sqrt{Q_{@i}(x_i - x_m)^2 Q_{@i}(y_i - y_m)^2}}$$

where $C_{n1}$ denotes a first correlation coefficient, subscript i a pixel number, $x_i$ a luminance level value of the pixel number for a current frame, $y_i$ a luminance level value of the pixel number for a previous frame, $X_m$ a histogram average value of the current frame, and $y_m$ a histogram average value of the previous frame.

4. The image quality enhancement circuit as claimed in claim 2, wherein the transfer function adjustor outputs to the mapper an accumulated average value of first transfer functions obtained from a first frame having the image change detected in the image change decision unit to a second frame just before the current frame while the image change detection signal does not occur from the image change decision unit.

5. The image quality enhancement circuit as claimed in claim 2, wherein the transfer function adjustor multiplies an accumulated average value of first transfer functions obtained from a first frame having the image change detected in the image change decision unit to a second frame just before the current frame while the image change detection signal does not occur from the image change decision unit, and the first transfer function of the current frame, respectively, by predetermined weights, and outputs to the mapper a value obtained from an addition of the multiplied values as a transfer function.

6. The image quality enhancement circuit as claimed in claim 2, wherein the inter-frame correlativity calculator further comprises:
a second correlation coefficient calculator calculating a second correlation coefficient from the first histogram data for a frame set to be compared with previous frames, and the second histogram data of the current frame; and
a panning decision unit determining a panning phenomenon if the second correlation coefficient gradually decreases for a predetermined number of frames which are set while the image change detection signal does not occur from the image change decision unit, to output a panning detection signal to the transfer function adjustor, the transfer function adjustor outputting to the mapper an accumulated average value of first transfer functions obtained from a first frame having the image change detected in the image change decision unit to a second frame just before the current frame if the panning detection signal is received from the panning decision unit.

7. The image quality enhancement circuit as claimed in claim 6, further comprising:
a memory storing the frame set to be compared with the previous frames as either the first frame having the image change detected in the image change decision unit or the second frame next to the frame determined to have the panning phenomenon by the panning decision unit.

8. The image quality enhancement circuit as claimed in claim 6, wherein the second correlation efficient is calculated based on a formula of:

$$C_{n2} = Q_{@i} \frac{(x_i - x_m)(z_i - z_m)}{\sqrt{Q_{@i}(x_i - x_m)^2 Q_{@i}(z_i - z_m)^2}}$$

in which $C_{n2}$ denotes a second correlation coefficient, subscript i a pixel number, $x_i$ a luminance level value of the pixel number for the current frame, $z_i$ a luminance level value of the pixel number for a comparison frame, $x_m$ a histogram average value of the current frame, and $z_m$ a histogram average value for the comparison frame.

9. The image quality enhancement circuit as claimed in claim 6, wherein the transfer function adjustor outputs to the mapper a signal corresponding to 1 as a transfer function value of the first transfer function if the panning detection signal and the image change detection signal are not received.

10. The image quality enhancement circuit as claimed in claim 1, wherein the first transfer function generator comprises:
a frame histogram calculator calculating the histogram data;
a frame average calculator calculating an average level of the inputted luminance signal for the frame unit;
a divider dividing the histogram data into a predetermined number of sub-frames based on the average level of the luminance signal to calculate a probability density function by the sub-frames; and
a CDF calculator calculating an accumulated density function by the sub-frames based on the probability density function outputted by the divider to output the accumulated density function as the first transfer function.

11. An image quality enhancement method of enhancing an image quality by performing histogram equalization on a luminance signal represented in the predetermined number of gray levels using inter-frame correlations, the method comprising:
calculating histogram data corresponding to a gray level distribution with respect to an inputted luminance signal by frame unit;
generating a first transfer function by using the histogram data;
calculating inter-frame correlation coefficients from the histogram data for at least one previous frame and a current frame to output inter-frame correlation information corresponding to correlations; and
selectively applying the first transfer function to the inputted luminance signal to correct and correcting the inputted luminance signal based on the inter-frame correlation information.

12. The method as claimed in claim 11, wherein the applying of the first transferring function to the inputted luminance signal comprises:
determining that there is an image change if a first correlation coefficient obtained for the correlation with respect to the previous frame and the current frame is below a set threshold value.

13. The method as claimed in claim 12, wherein the first correlation coefficient is calculated based on a formula of:

$$C_{n1} = Q_{@i} \frac{(x_i - x_m)(y_i - y_m)}{\sqrt{Q_{@i}(x_i - x_m)^2 Q_{@i}(y_i - y_m)^2}}$$

in which $C_{n1}$ denotes a first correlation coefficient, subscript i a pixel number, $x_i$ a luminance level value of the pixel number for a current frame, $y_i$ a luminance level value of the pixel number for the previous frame, $x_m$ a histogram average value of the current frame, and $y_m$ a histogram average value of the previous frame.

14. The method as claimed in claim 13, wherein an accumulated average value of first transfer functions obtained from a first frame having the first correlation coefficient below the threshold value a second frame just before the current frame is, as a transfer function, applied to the inputted luminance signal for correction while the first correlation coefficient is not below the set threshold value.

15. The method as claimed in claim 13, further comprising:
    calculating a second correlation coefficient from histogram data for a frame set to be compared from previous frames and histogram data of a current frame, wherein a panning phenomenon is determined if the second correlation coefficient gradually decreases for the predetermined number of frames which is set while the first correlation coefficient is not below the set threshold value, and an average value of the first transfer functions obtained from a first frame having the first correlation coefficient below the threshold value to a second frame just before the current frame is, as a transfer function, applied to the inputted luminance signal for correction.

16. The method as claimed in claim 15, wherein the frame to be compared with the current frame to calculate the second correlation coefficient is updated to be set as the frame determined as the image change detected in an image change decision unit or a panning phenomenon stop frame next to a final frame determined as the panning phenomenon from the panning decision unit.

17. The method as claimed in claim 16, wherein the second correlation efficient is calculated by:

$$C_{n2} = Q_{@i} \frac{(x_i - x_m)(z_i - z_m)}{\sqrt{Q_{@i}(x_i - x_m)^2 Q_{@i}(z_i - z_m)^2}}$$

where $C_{n2}$ denotes a second correlation coefficient, subscript i a pixel number, $x_i$ a luminance level value of the pixel number for the current frame, $z_i$ a luminance level value of the pixel number for a comparison frame, $x_m$ a histogram average value of the current frame, and $z_m$ a histogram average value for the comparison frame.

18. The method as claimed in claim 17, wherein the correction is not performed with respect to the inputted luminance signal if the inter-frame correlation information is not determined as the image change and the panning phenomenon.

19. An image quality enhancement circuit using inter-frame correlations in a circuit performing histogram equalization on a luminance signal represented in the predetermined number of gray levels, comprising:

a first transfer function generator calculating histogram data corresponding to a gray level distribution with respect to an inputted luminance signal by a frame unit to generate a first transfer function based on the histogram data;
an inter-frame correlativity calculator calculating an inter-frame correlation coefficient from the histogram data for at least one previous frame and a current frame, to output inter-frame correlation information corresponding to the inter-frame correlation coefficients; and
a mapper correcting the inputted luminance signal based on the first transfer function and the inter-frame correlation information.

20. The image quality enhancement circuit as claimed in claim 19, wherein the first transfer function generator generates an accumulated average value from first transfer functions of the previous frames, and the mapper corrects the inputted luminance signal based on the first transfer function, the inter-frame correlation information, and the accumulated average value.

21. The image quality enhancement circuit as claimed in claim 20, wherein the inter-frame correlation information comprises a panning detection signal and an image change detection signal according to the histogram data, and the mapper corrects the inputted luminance signal based on the first transfer function, the panning detection signal, an image change detection signal, and the accumulated average value.

22. The image quality enhancement circuit as claimed in claim 21, further comprising:
    a transfer function adjustor adjusting the first transfer function based on the panning detection signal and the image change detection signal outputted from the inter-frame correlativity calculator and outputting the adjusted first trans function as a final transfer function, wherein the mapper corrects the inputted luminance signal based on the final transfer function and the accumulated average value.

23. The image quality enhancement circuit as claimed in claim 19, further comprising:
    a transfer function adjustor generating a final transfer function according to the first transfer function and the inter-frame correlation information; and
    a frame average calculator generating an accumulated average value of first transfer functions of the previous frames, wherein the mapper corrects the inputted luminance signal based on the final transfer function and the accumulated average value.

24. The image quality enhancement circuit as claimed in claim 23, wherein the first transfer function generator generates the first transfer function according to the accumulated average value and the histogram.

25. The image quality enhancement circuit as claimed in claim 24, wherein the first transfer function generator generates first and second probability density functions according to the accumulated average value and the histogram in first and second sub-frames.

26. The image quality enhancement circuit as claimed in claim 24, wherein the first transfer function generator generates the first transfer function according to the first and second probability density functions.

27. The image quality enhancement circuit as claimed in claim 23, wherein the frame average calculator comprises:
    a memory storing the first transfer functions generated from the first transfer function generator; and
    a temporal filter generating the accumulation average value according to the first transfer functions.

28. The image quality enhancement circuit as claimed in claim 23, wherein the inter-frame correlativity calculator comprises:
a first memory generating the inputted luminance signal;
a second memory generating first histogram corresponding to the at least one previous frame from the histogram data;
a third memory generating second histogram data of another one of the previous frames from the histogram data;
a first correlation coefficient calculator generating a first correlation coefficient according to current histogram of the current frame and the first histogram;
a second correlation coefficient calculator generating a second correlation coefficient according to the current histogram of the current frame and the second first histogram;
an image change decision unit generating an image change detection signal according to the first correlation coefficient as the inter-frame correlation information; and
a panning decision unit generating a panning detection signal according to the second correlation coefficient as the inter-frame correlation information, the transfer function adjustor generating the final transfer function according to the first transfer function, the image change detection signal, the panning detection signal, and the accumulated average signal.

29. The image quality enhancement circuit as claimed in claim 19, wherein the first transfer function generator comprises:
a frame histogram calculator calculating the histogram data of the at least one previous frame and the current frame;
a frame average calculator calculating an accumulated average value of the inputted luminance signal;
a divider dividing the gray level distribution by a number corresponding to the accumulated average value to generate first and second probability density functions in first and second sub-frames of the inputted luminance signal, respectively;
a first CDF calculator generating a first accumulated density function according to the first probability density function in the first sub-frame;
a second CDF calculator generating a second accumulated density function according to the second probability density function in the second sub-frame;
a CDF memory storing one of the first and second probability density functions as the first transfer function; and
a transfer function adjustor generating the final transfer function according to the first and second probability density functions and the inter-frame correlation information.

30. The image quality enhancement circuit as claimed in claim 29, wherein the mapper corrects the inputted luminance signal based on the final transfer function and the accumulated average value.

31. The image quality enhancement circuit as claimed in claim 19, wherein the inter-frame correlativity calculator comprises:
a first memory generating the inputted luminance signal;
a second memory generating previous histogram corresponding to the at least one previous frame from the histogram data;
a correlation coefficient calculator generating a correlation coefficient according to current histogram of the current frame and the previous histogram of the at least one previous frame;
a frame average calculator generating an accumulated average signal according to first transfer functions from the first transfer function generator;
an image change decision unit generating an image change detection signal according to the correlation coefficient as the inter-frame correlation information; and
a transfer function adjustor having a frame average calculator generating an accumulated average signal according to the first transfer function from the first transfer function generator, and generating the final transfer function according to the first transfer function, the image change detection signal, and the accumulated average signal.

32. The image quality enhancement circuit as claimed in claim 31, wherein the frame average calculator comprises:
another memory storing the first transfer function generated from the first transfer function generator; and
a temporal filter generating the accumulation average value according to the first transfer function.

33. The image quality enhancement circuit as claimed in claim 31, wherein transfer function adjustor comprises:
an arithmetic operator generating another transfer function according to the accumulated average value and the first transfer function;
a selector generating the final transfer function according to the first transfer function, the another transfer function, and the image change detection signal.

34. The image quality enhancement circuit as claimed in claim 33, wherein the another transfer function is obtained by a formula:

$$fw = w1*f1 + w2*fm$$

where f1 is the first transfer function, fm is the accumulated average value, and w1 and w2 are weight values.

35. An image quality enhancement method using inter-frame correlations in a circuit performing histogram equalization on a luminance signal represented in the predetermined number of gray levels, the method comprising:
calculating histogram data corresponding to a gray level distribution with respect to an inputted luminance signal by a frame unit to generate a first transfer function based on the histogram data;
calculating an inter-frame correlation coefficient from the histogram data for at least one previous frame and a current frame, to output inter-frame correlation information corresponding to the inter-frame correlation coefficients; and
correcting the inputted luminance signal based on the first transfer function and the inter-frame correlation information.

* * * * *

UNITED STATES PATENT AND TRADEMARK OFFICE
CERTIFICATE OF CORRECTION

PATENT NO. : 7,286,716 B2 Page 1 of 1
APPLICATION NO. : 10/600647
DATED : October 23, 2007
INVENTOR(S) : Jae-won Kim It is certified that error appears in the above-identified patent and that said Letters Patent is hereby corrected as shown below:

Column 12, Line 34, change "trans" to --transfer--.

Signed and Sealed this

Twenty-ninth Day of April, 2008

JON W. DUDAS
*Director of the United States Patent and Trademark Office*